Jan. 25, 1966  D. H. PRYOR ET AL  3,231,803
PLURAL MOTOR, GENERATOR-FED ELECTRIC DRIVE FOR DRAWWORKS
Filed March 4, 1963  3 Sheets-Sheet 1

Albert A. Ashton
Dale H. Pryor
James E. Pryor
INVENTORS

BY
ATTORNEYS

Jan. 25, 1966    D. H. PRYOR ET AL    3,231,803
PLURAL MOTOR, GENERATOR-FED ELECTRIC DRIVE FOR DRAWWORKS
Filed March 4, 1963    3 Sheets-Sheet 2

Albert A. Ashton
Dale H. Pryor
James E. Pryor
INVENTORS

Jan. 25, 1966  D. H. PRYOR ET AL  3,231,803
PLURAL MOTOR, GENERATOR-FED ELECTRIC DRIVE FOR DRAWWORKS
Filed March 4, 1963  3 Sheets-Sheet 3

Albert A. Ashton
Dale H. Pryor
James E. Pryor
INVENTORS

BY
ATTORNEYS

United States Patent Office 3,231,803
Patented Jan. 25, 1966

3,231,803
PLURAL MOTOR, GENERATOR-FED ELECTRIC DRIVE FOR DRAWWORKS
Dale H. Pryor, Houston, James E. Pryor, Midland, and Albert A. Ashton, Dallas, Tex., assignors to The Youngstown Sheet and Tube Company, Youngstown, Ohio, a corporation of Ohio
Filed Mar. 4, 1963, Ser. No. 262,649
4 Claims. (Cl. 318—45)

This invention relates to drives for drawworks of the type used on drilling rigs, and more particularly to an electric motor drive system in which the conventional multispeed transmission is eliminated. In one aspect it relates to a system in which greater torque can be obtained than with conventional systems employing transmissions.

Conventionally the drawworks of a drilling rig have been driven by internal combustion engines through selective speed transmissions. For instance, a four-speed transmission has been extensively employed. In some instances electric motor drives have been used in which the internal combustion engines have supplied power to generators which have in turn driven electric motors, which have in turn been connected to the drawworks through a multispeed transmission. These multispeed transmissions have been required because drawworks speed and torque vary during drilling of a well. For instance, at shallow depths high speed operation is desired to reduce the time involved in making round trips in the well. On the other hand, when the well reaches great depths the pipe string is usually moved at low speed and high torque due to the tremendous length of pipe involved.

It is an object of this invention to eliminate the multispeed transmission drive heretofore employed between drawworks and their source of power.

It is another object of this invention to greatly reduce maintenance, rig-up and transportation problems by providing a drawworks drive system in which electric motors drive the main shaft of the drawworks directly.

Another object is to provide a stretched out smooth power curve for an electrically driven drawworks.

Another object is to increase the torque output of electric motors driving a drawworks without increasing the amount of power available for driving the system.

Other objects, features and advantages of this invention will be apparent from the drawings, the specification and the claims.

In the drawings, wherein like numerals indicate like parts, and wherein an illustrative embodiment of this invention is shown:

In accordance with this invention, power from any prime mover, such as the conventional internal combustion engine, is supplied to a generator means which in turn supplies power to a plurality of electric motors. These electric motors drive the hoisting drawworks directly. Instead of the conventional multispeed transmission, a system of controls is provided to permit the motors to deliver the desired torque and r.p.m. to the drawworks drum. This control system involves the operation of the drawworks motors selectively in series and in parallel, and with selective degrees of field weakening of the motor fields to give the desired power absorption curve for the motors.

In accordance with one concept of this invention, the electric motors may be rated at a much higher horsepower than the engine horsepower available, and this results in a stretching out of the hoisting torque-r.p.m. curve and permits the attaining of much greater torque than is conventionally obtained.

Figure 1:
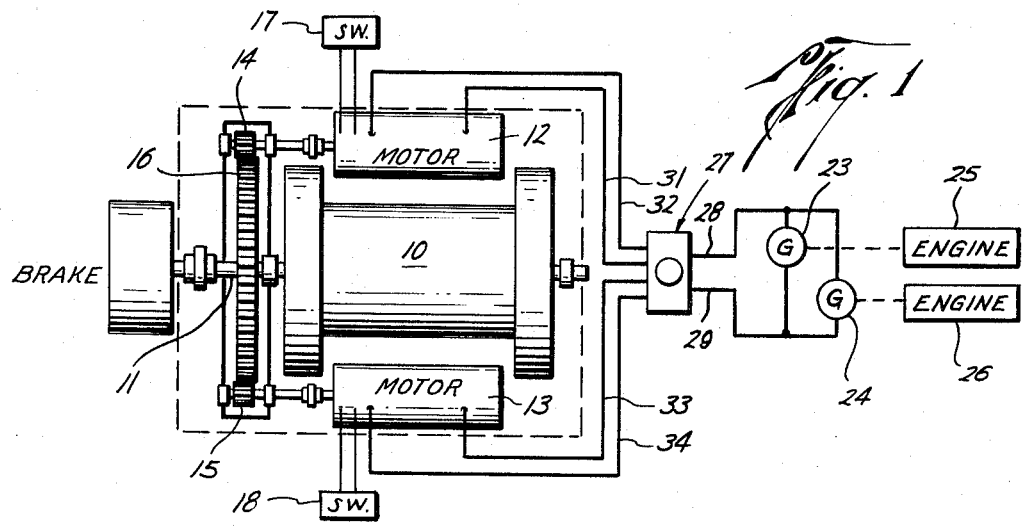
FIGURE 1 is a plan view of a drawworks powered in accordance with this invention.

Referring to FIGURE 1, the drawworks illustrated includes a drum 10 non-rotatably mounted on a main shaft 11.

A plurality of motors 12 and 13 drive the drawworks. Two or more motors may be used to drive the drawworks in accordance with this invention.

The several motors are interconnected with the main shaft with a fixed drive ratio. Means for providing this interconnection may be provided by pinions 14 and 15 on the arbors of motors 12 and 13, respectively, which drive the gear 16 on main shaft 11.

Figure 8:
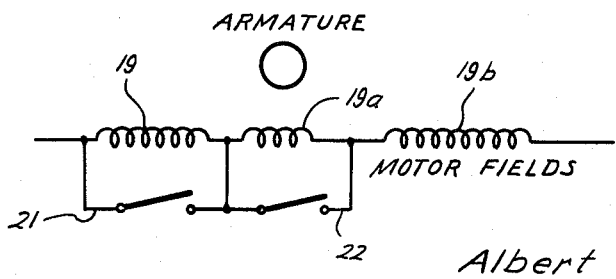
FIGURE 8 is a diagram of a form of field weakening of the motor fields.

In accordance with this invention, switch means 17 and 18 is provided for the motors 12 and 13, respectively, to weaken the field windings of the motors to change their power absorption curve and give an increase in r.p.m. Any desired degree of field weakening might be employed and more than one degree of field weakening might be selectively employed. As illustrated in FIGURE 8, the field winding 19, 19a and 19b of each motor might have provisions for shunting across a portion of the fields as indicated by shunt circuits 21 and 22. It is apparent that by closing shunt circuit 21, the field winding 19 may be bypassed, and by closing shunt circuits 21 and 22 both field sections 19 and 19a might be bypassed. Of course, selectively, shunt 22 might be closed and circuit 21 remain open to provide still a third setting. By reducing the ampere turns in the motor field, the motor r.p.m. can be increased with a resulting decrease in torque to provide for high speed-low torque operation.

Generator means supplied by generators 23 and 24 provide current for the motors 12 and 13. Any desired number of generators may be employed, and they should be connected in parallel as illustrated in FIGURE 1.

The generators are driven by appropriate engine means such as engines 25 and 26. These may be internal combustion, or any other desired type of prime mover.

In order to provide for different power curves, means is provided for connecting the motors 12 and 13 selectively in parallel or in series with the generators 23 and 24. This means is provided by the switch indicated generally at 27 which receives power from the generators through lines 28 and 29 and supplies power to the motors through lines 31, 32, 33 and 34.

Figure 2:
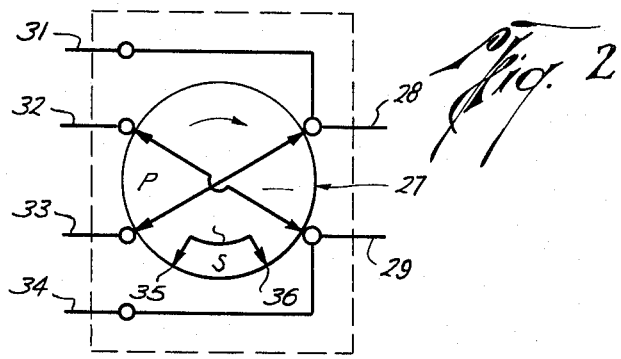
FIGURE 2 is a schematic illustration of switch means for connecting the motors in series or in parallel.

The switch 27 may be any simple two-way switch such as shown in FIGURE 2. As illustrated, the switch 27 is connected for parallel operation and current from line 28 flows through line 31 to motor 12 and returns through line 32 to line 29. In like manner, the current from line 28 flows across switch 27 and passes from line 33 through motor 13 and returns via line 34 to line 29. With the switch rotated to position the series connect contacts 35 and 36 in contact with lines 32 and 33, it will be appreciated that current flows from line 28 to line 31 to motor 12 to line 32, through contact 35–36 to line 33 to motor 13 to line 34 and thence to line 29.

With the above system, the motors may be connected in series for low r.p.m.-high torque operation. As a torque-r.p.m. curve and an ampere-volts curve for an electric motor are substantially the same, it will be appreciated that by arranging the motors in series the voltage across each motor will be reduced to reduce its maximum r.p.m. but the amperage across each motor will be increased to increase its maximum torque output. This power absorption curve is shown by curve 37 in FIGURE 5. When switch 27 is positioned for parallel operation, the power absorption curve 38 of FIGURE 5 will result in which a lower maximum torque is available, but the r.p.m. attainable is substantially doubled.

To obtain even greater r.p.m. for light load operation, the field weakening switches 16 and 17 may be selectively used while the motors are in parallel to provide a 75% field which will give curve 39, or a 57½% field which will give curve 41.

Figure 5:
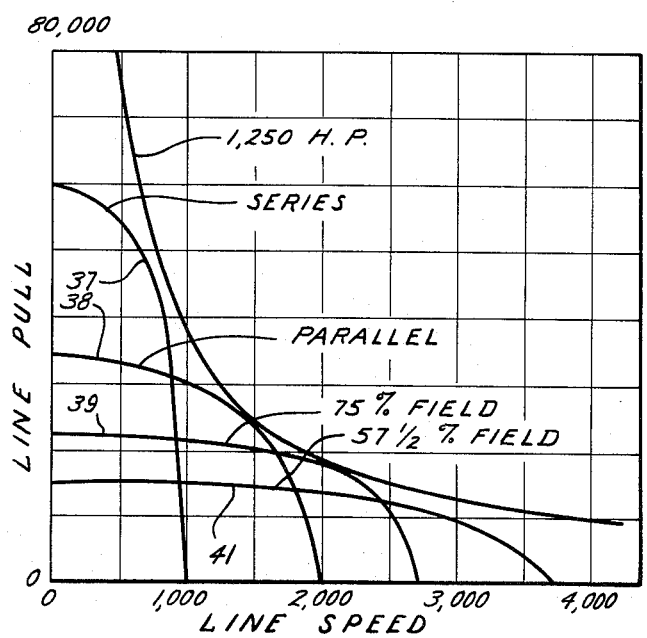
FIGURE 5 is a graph showing the power absorption curves of an electric drive system constructed in accordance with this invention.
Figure 6:
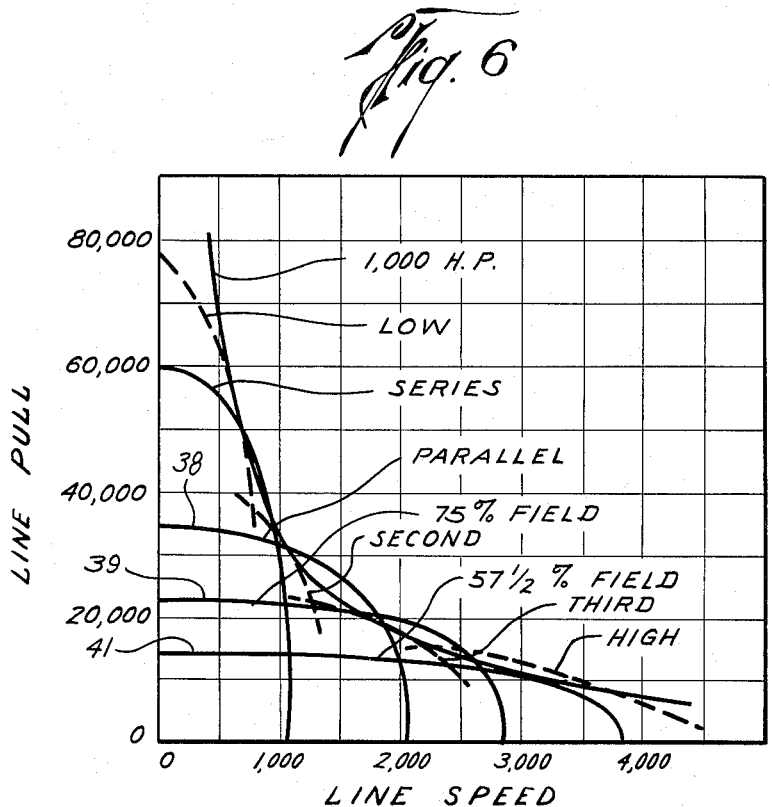
FIGURE 6 is a graph showing a comparison of the power curves of FIGURE 5 with the power curves of an electric system having the same horsepower available and utilizing a four-speed transmission as has been common in the past.

The significance of the curves of FIGURE 5 will be appreciated by reference to FIGURE 6 in which these curves are plotted on a common graph with a series of curves of low, second, third and high gear of a power train in which an electric motor drives a drawworks through a selective transmisison. The amount of power available in each case is approximately the same. It will be noted that in series operation a slightly greater r.p.m. can be obtained at the forty of fifty thousand pound torque range when using this invention, but the maximum torque available is less than that available using a four-speed transmisison. The curves here for various types of operation of the motors in accordance with this invention are plotted for continuous operation. Thus, it is apparent that for short periods of time the motors may be operated at much greater torque. The very high torque requirements are usually encountered for only a short period of time and these high torque requirements can be accommodated with operation of the electric motors at their maximum capacity for short periods of time. The curve 38 representing parallel operations will give substantially more pull at intermediate operation than is possible with the multispeed transmission. The curves 39 and 41 illustrate how field weakening may be employed to obtain the higher r.p.m. as compared with the third and fourth gears in a conventional transmission. By utilizing 75% field, greater torque can be obtained for a given r.p.m., and by utilizing 57½% field ample torque may be maintained while stretching out the line speed to more than 3500 feet per minute. It will be noted that by the use of this invention the horsepower curves of the four-speed transmission are filled in the intermediate range which is the greatest area of operation. This is due, of course, to greater efficiency of the electric motors alone as compared with motors and transmissions. Thus, not only do we increase the efficiency of the system by eliminating the transmission, but we also eliminate the need for maintaining the transmission. Over a substantial length of time the transmission maintenance cost is of course significant. Also, the ability to lift a given load in the normal operating range at a slightly greater feet per minute will reduce round-trip time, and in the long run will provide a considerable advantage, particularly in very deep wells.

Figure 3:
FIGURE 3 is a graph showing the power absorption curve of a common type of electric motors in solid lines, and in dashed lines the power absorption curve of the same motor when underpowered.
Figure 3:
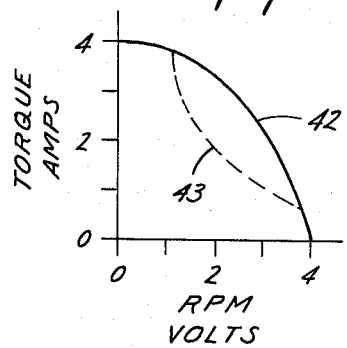
Figure 4:
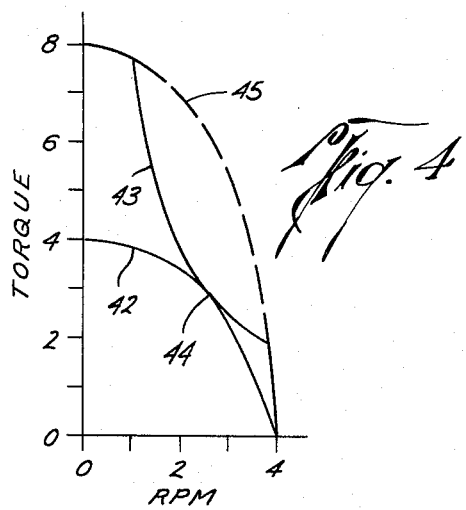
FIGURE 4 is a graph showing the power absorption curve of the motor of FIGURE 3 and the power absorption curve of two such motors when driven with the same total horsepower as supplied to the single motor, and also showing in dashed lines the power absorption curve of two motors when driven at full power.

By providing motors having a power absorption capacity substantially greater than the engine horsepower available, the performance curve may be further smoothed out and much greater torque obtained at low feet per minute than is possible with the conventional multispeed transmission. In FIGURE 3 there is shown a power absorption curve 42 for motor 12 which may be a D.C. shunt motor. If we drive this motor at less than full power, the curve 43 results. By reference to FIGURE 4, the power absorption curve of the two motors 12 and 13 is shown when driven by engines 25 and 26 developing a total horsepower which is less than the rated horsepower of motors 12 and 13. The curve 42 has been repeated. Curve 43 represents the power absorption curve of the two motors 12 and 13 when driven by engines 25 and 26 with the motors having twice the rated capacity of the power delivered to the motors. To be more specific, curve 42 may represent the power absorption curve of a 600 horsepower motor driven by a motor and generator capable of fully filling out the power curve. Curve 43 represents the same power train except that an additional motor is added and depicts two motors connected in parallel each having a horsepower rating of 600 driven by a source capable of putting out only 600 horsepower. It will be noted that curves 42 and 43 meet at point 44 and the effect of using two motors instead of one is to stretch out the power absorption curve and permit a much wider range of torque to be obtained than is possible with a single motor. For further comparison, the dashed line 45 shows the power absorption curve of two motors 12 and absorbing full power.

Figure 7:
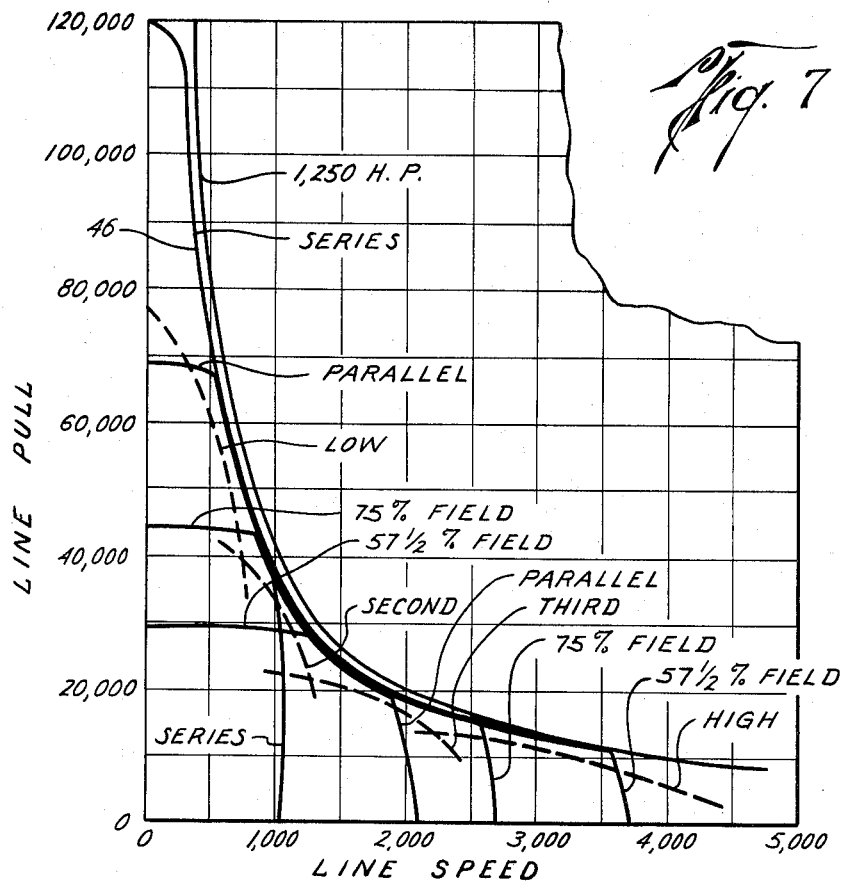
FIGURE 7 is a graph showing a comparison of the conventional transmission system curve as in FIGURE 6 with a modified form of this invention in which the power absorption capacity of the electric motors is greater than the output capacity of the engines driving the system.

By reference to FIGURE 7, the significance of the use of two motors having a rated capacity much greater than the power available will be apparent. The standard electrical motor's four-speed transmission is again depicted by dashed lines labeled low, second, third and high. The power absorption curve for the two motors arranged in series is shown at 46 and it will be noted that the line pull available in this instance has increased almost to 120,000 pounds. From about the 70,000 to the 40,000 line pull level, series or parallel operation may be carried out with about the same power absorption curve. Below 40,000, parallel operation should be carried out down to the 20,000 pound level. It will be noted that there is a common area of overlapping between the field weakening and parallel and series operation, giving wide selectivity. For speed in excess of 2500, the 57½% field weakening is used to take the effective speed up to about 3500. It is pointed out that not only does this system dispense with the selective transmission and permit a much greater line pull at the continuous rated capacity of the motors, it also smooths out the power absorption curve for the system to a long, smooth curve.

From the above it is believed apparent that all of the objects of this invention have been accomplished. As all connections may be made by electric lines, the need for aligning power chain and transmisison packages has been eliminated. Obviously the system rig-up time is much less than the conventional mechanical system in which various components of the system must be aligned and fastened together. The size of the transportable components has been reduced, as the motors and drawworks are made up in one unitized group which may be transported separately from the remainder. The generators may also be packaged in any desired arrangement with or without the engines.

As the need for the mechanical trransmission has been eliminated, the efficiency of the system has been increased due to reduced friction, and the maintenance problems associated with multispeed transmissions are eliminated. Direct drive between the motors and the hoisting drum provides the minimum possible friction losses. As additional engines and generators will be employed to operate pumps and other equipment, it will be apparent that great versatility is present and selective engines and generators may be used as desired.

In connection with the form of the invention depicted in FIGURE 7, it will be appreciated that the peak adsorption curve will be stretched out where the motor rating is in excess of the peak available. As a practical matter, it is preferred that the excessive motor capacity be at least one and one-half times the engine power available as this will give a fairly smooth operating curve.

The term "field weakening" as used herein refers to changes in the motor absorption curve by reducing the field strength. This may be done in any desired manner as by a field weakening as shown herein, or by an equivalent form of resistance, rheostat, etc.

While the illustrated apparatus and curves are based on D.C. shunt wound motors and generators, it will be appreciated that other types of motors and generators may be used.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. Drilling apparatus comprising,
a drawworks,
a plurality of electric motors,
means providing a driving connection between said motors and said drawworks,
generator means,
means electrically connecting said generator means to said motors for supplying electricity to said motors,
engine means,
and means connecting said engine means to said generator means for supplying power to said generator means, said electric motors having a total power absorption capacity substantially larger than the power output capacity of the engine means whereby the torque available to drive said drawworks is substantially greater than would be available from motors having a total power adsorption capacity equal to the power output capacity of the engine means.

2. Drilling apparatus comprising,
a drawworks,
a plurality of electric motors,
means providing a driving connection between said motors and said drawworks,
generator means,
means electrically connecting said generator means to said motors for supplying electricity to said motors,
engine means,
and means connecting said engine means to said generator means for supplying power to said generator means, said electric motors having a total power absorption capacity of not less than approximately one and one-half times the power output capacity of the engine means whereby the torque available to drive said drawworks is substantially greater than would be available from motors having a total power absorption capacity equal to the power output capacity of the engine means.

3. Drilling apparatus comprising,
a drawworks,
a plurality of electric motors,
means providing a driving connection between said motors and said drawworks,
generator means,
means electrically connecting said generator means to said motors for supplying electricity to said motors,
engine means,
means connecting said engine means to said generator means for supplying power to said generator means,
said electric motors having a total power absorption capacity of not less than approximately one and one-half times the power output capacity of the engine means whereby the torque available to drive said drawworks is substantially greater than would be available from motors having a total power absorption capacity equal to the power output capacity of the engine means,
and switch means in said electrical connecting means for connecting said motors in series or in parallel with said generator means.

4. Drilling apparatus comprising,
a drawworks,
a plurality of electric motors,
means providing a driving connection between said motors and said drawworks,
generator means,
means electrically connecting said generator means to said motors for supplying electricity to said motors,
engine means,
and means connecting said engine means to said generator means for supplying power to said generator means,
said electric motors having a total power absorption capacity of not less than approximately one and one-half times the power output capacity of the engine means whereby the torque available to drive said drawworks is substantially greater than would be available from motors having a total power absorption capacity equal to the power output capacity of the engine means,
switch means in said electrical connecting means for connecting said motors in series or in parallel,
and means for selectively weakening the fields of said motors.

References Cited by the Examiner
UNITED STATES PATENTS

| | | | |
|---|---|---|---|
| 1,511,990 | 10/1924 | Hartzell | 318—103 X |
| 2,370,855 | 3/1945 | Fox | 318—103 X |

ORIS L. RADER, *Primary Examiner.*